United States Patent [19]
Chen

[11] Patent Number: 5,176,462
[45] Date of Patent: Jan. 5, 1993

[54] BUILT-UP SCREEN COUPLING STRUCTURE

[76] Inventor: Kuei-Feng Chen, No. 59; Lane 496, Niou Pu S. Rd., Hsinchu, Taiwan

[21] Appl. No.: 620,015

[22] Filed: Nov. 30, 1990

[51] Int. Cl.⁵ .......................... F16B 9/00; A47G 5/00
[52] U.S. Cl. ........................... 403/252; 403/254; 403/256; 403/380; 403/407.1; 160/135; 52/584
[58] Field of Search ............ 403/252, 254, 255, 264, 403/380, 407.1, 257, 256, 406.1, 316, 317; 160/135; 52/239, 241, 584

[56] References Cited

U.S. PATENT DOCUMENTS

| | | | |
|---|---|---|---|
| 2,855,255 | 10/1958 | Sonderstrup | 403/256 |
| 3,601,432 | 8/1971 | Fenwicki | 403/252 X |
| 4,406,374 | 9/1983 | Yedor | 403/254 X |
| 4,549,832 | 10/1985 | Sterl | 403/264 |
| 4,618,064 | 10/1986 | Viklund | 403/254 X |
| 4,632,473 | 12/1986 | Smith | 403/252 X |
| 4,637,749 | 1/1987 | Jones et al. | 403/380 X |
| 4,907,388 | 3/1990 | Siahatgar | 403/252 X |
| 5,004,371 | 4/1991 | Sorensen | 160/135 X |

Primary Examiner—Peter M. Cuomo
Attorney, Agent, or Firm—Bacon & Thomas

[57] ABSTRACT

A built-up screen coupling structure, comprising at least two screen board frames side matched together by a plurality of fastening devices and at least an adjusting device. The screen board frames have each at least a side end having a slot at the top and a plurality of relatively smaller openings at the outer side. The openings are respectively divided by a plurality of dividing boards. The fastening devices are respectively fastened in the openings and clamped on the dividing boards to connect two screen board frames together. The adjusting device is fastened in the slot to secure the connection.

3 Claims, 13 Drawing Sheets

BUILT-UP SCREEN COUPLING STRUCTURE

BACKGROUND OF THE INVENTION

1. Field of the Invention

The present invention relates to built-up screens, and more particularly relates to a built-up screen coupling structure in which each two screen board frames are coupled together by a plurality of fastening devices and reinforced by an adjusting device.

2. Description of the Prior Art

Figures 1, 1A:
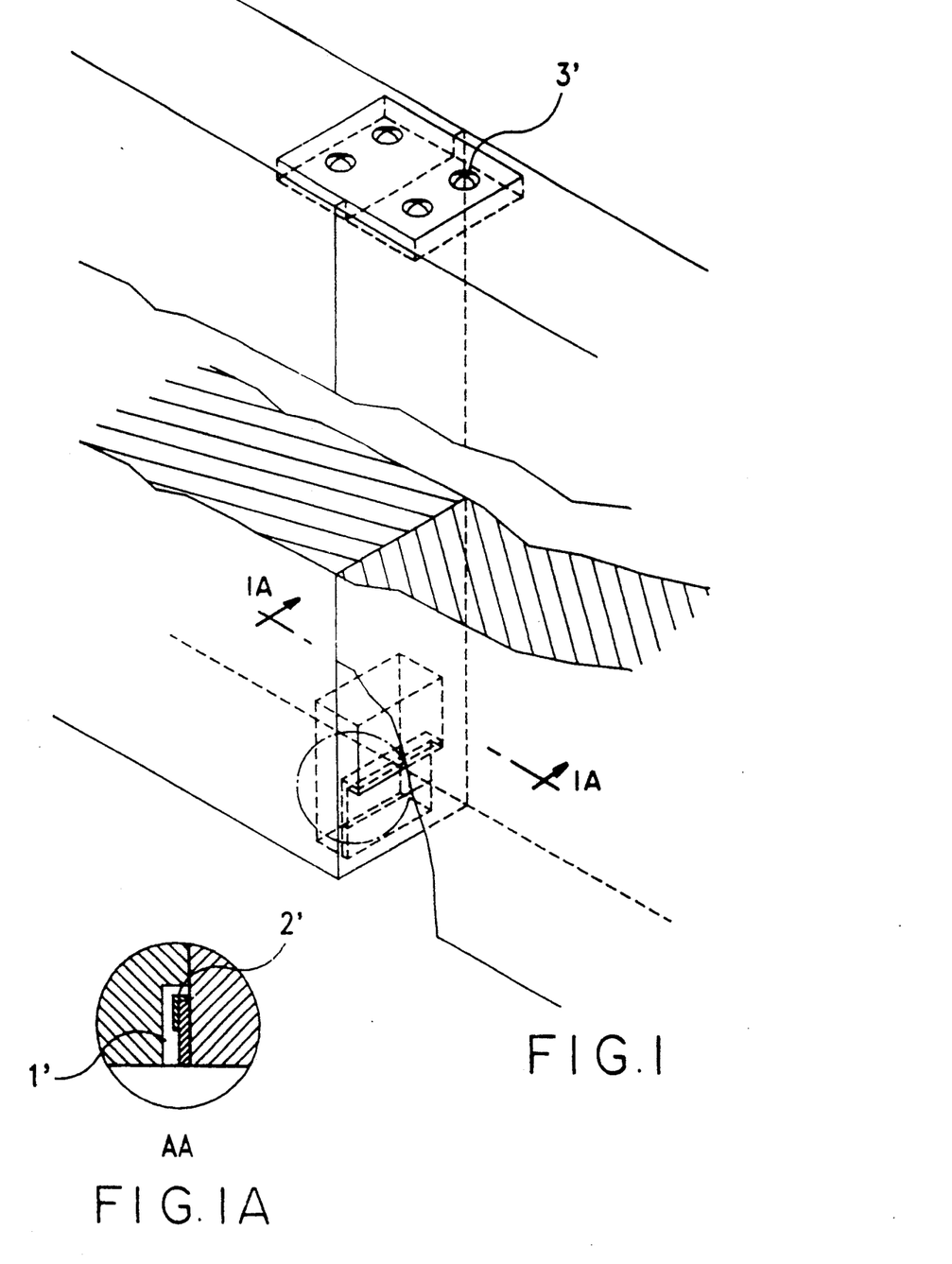
FIG. 1 illustrates a built-up screen coupling structure according to the prior art.
FIG. 1A is a cross-sectional view taken along line 1A—1A in FIG. 1.
Figure 10:
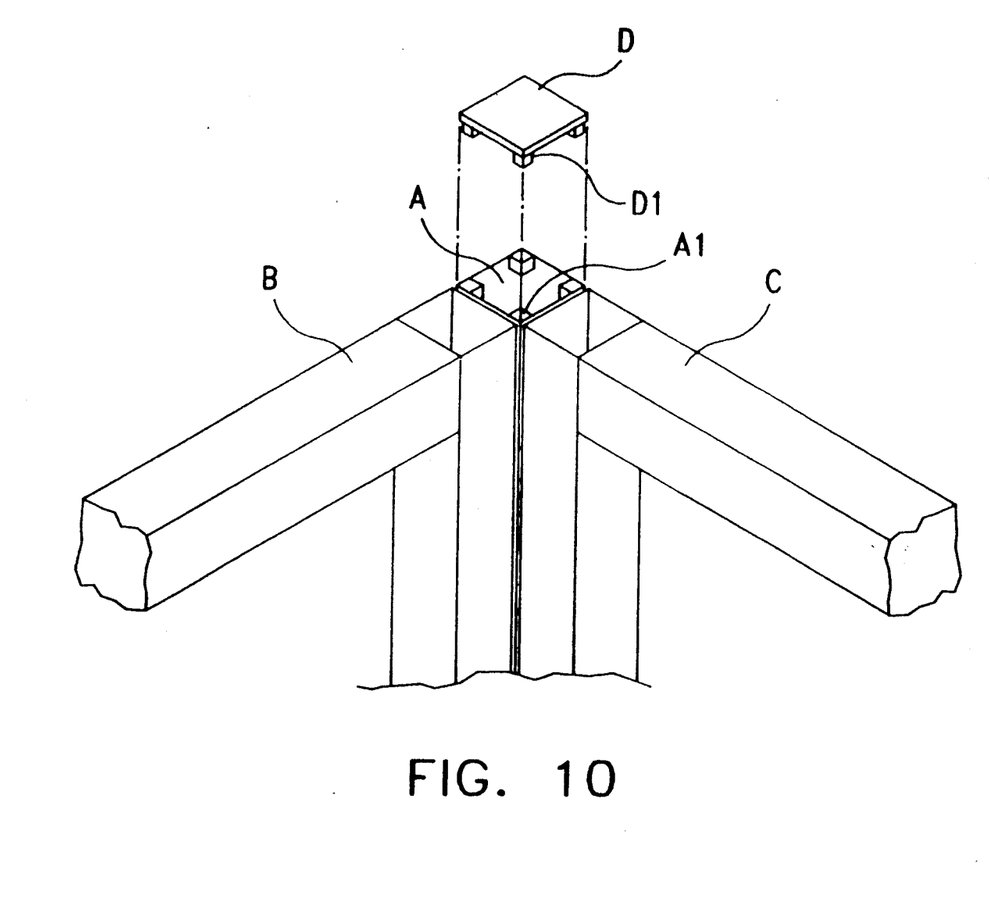
FIG. 10 illustrates two screen board frames connected together in 90° angle by a connecting frame and a cover according to the prior art.
Figure 11:
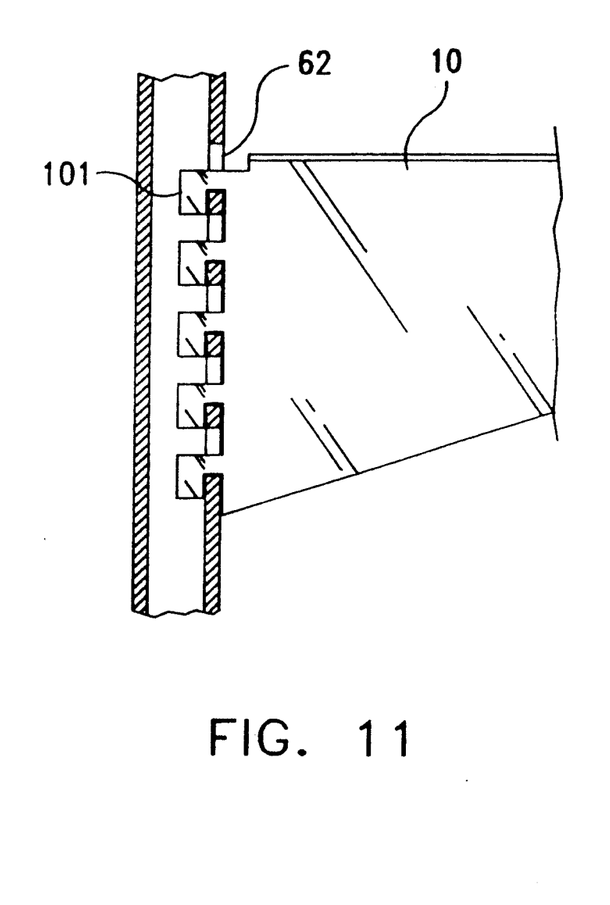
FIG. 11 illustrates the connection of a supporting plate to a screen board frame according to the prior art.

FIG. 1 illustrates a built-up screen coupling structure according to the prior art, in which the first screen board frame has a "⌈" shaped lock pin 2' fastened in a "⌈" shaped slot on the second screen board frame for connection. Because the slot and the lock pin are both designed in "⌈" shape, i.e. in angle structure, only one set of slot and lock pin can be made on the screen board frames at a lower position. If two or more sets of slots and lock pins are respectively made on the two screen board frames, the connection of the slots with the lock pins will be very difficult to achieve. Because there is only one lock pin on the first screen board frame for locking in the slot on the second screen board frame, the connection of the two screen board frames is not very stable. Further, the stands which support a built-up screen are generally connected to the screen board frames of a built-up screen by screws which are generally fastened through the face panel. Because the head of the screws is disposed visible on the face panel, the sense of beauty of a built-up screen is somewhat destroyed. When two screen board frames are to be connected together in 90° angle, a connecting frame A is commonly used. After connection, as shown in FIG. 10, the connecting frame A must be covered with a cover plate D so that a smooth and beautiful top surface can be obtained on the built-up screen. The cover plate D has a plurality of stub tenons D1 at the bottom respectively inserted in a plurality of stub mortises A1 on the top of the connecting frame A. This tenon-and-mortise connection can not fixedly secure the cover plate D to the connecting frame A once the cover plate D is pushed upward by an external force. Referring to FIG. 11, there is illustrated a supporting plate connected to a screen board frame for supporting a table, in which the supporting plate has a plurality of unitary, hooked strips at one end and respectively hooked in a plurality of notches on a screen board frame. In this connection structure, there is no any locking device to lock up the connection of the supporting plate with the screen board frame, and therefore, the supporting plate may be easily detached from the screen board frame or get loosened.

SUMMARY OF THE INVENTION

The present invention has been accomplished to eliminate the aforesaid problems. A built-up screen coupling structure of the present invention comprises at least two screen board frames side matched together by a plurality of fastening devices and at least an adjusting device. The screen board frames have each at least a side end having a slot at the top and a plurality of relatively smaller openings at the outer side, which openings are divided by a plurality of dividing boards. The fastening devices are respectively fastened in the openings and clamped on the dividing boards to connect two screen board frames together. The adjusting device is fastened in the slot to secure the connection. A connecting frame which has side channels is provided for connecting two screen board frames together in 90° angle. A plurality of supporting boards which have each a locking bar are respectively connected to the screen board frames for supporting a table.

BRIEF DESCRIPTION OF THE DRAWINGS

FIG. 3-1 is a perspective view of the adjusting device according to the present invention;

FIG. 3-2 is a perspective view of the fastening device according to the present invention;

FIG. 3-3 is a side view of the fastening device shown in FIG. 3-2;

DETAILED DESCRIPTION OF THE PREFERRED EMBODIMENT

Figure 2:
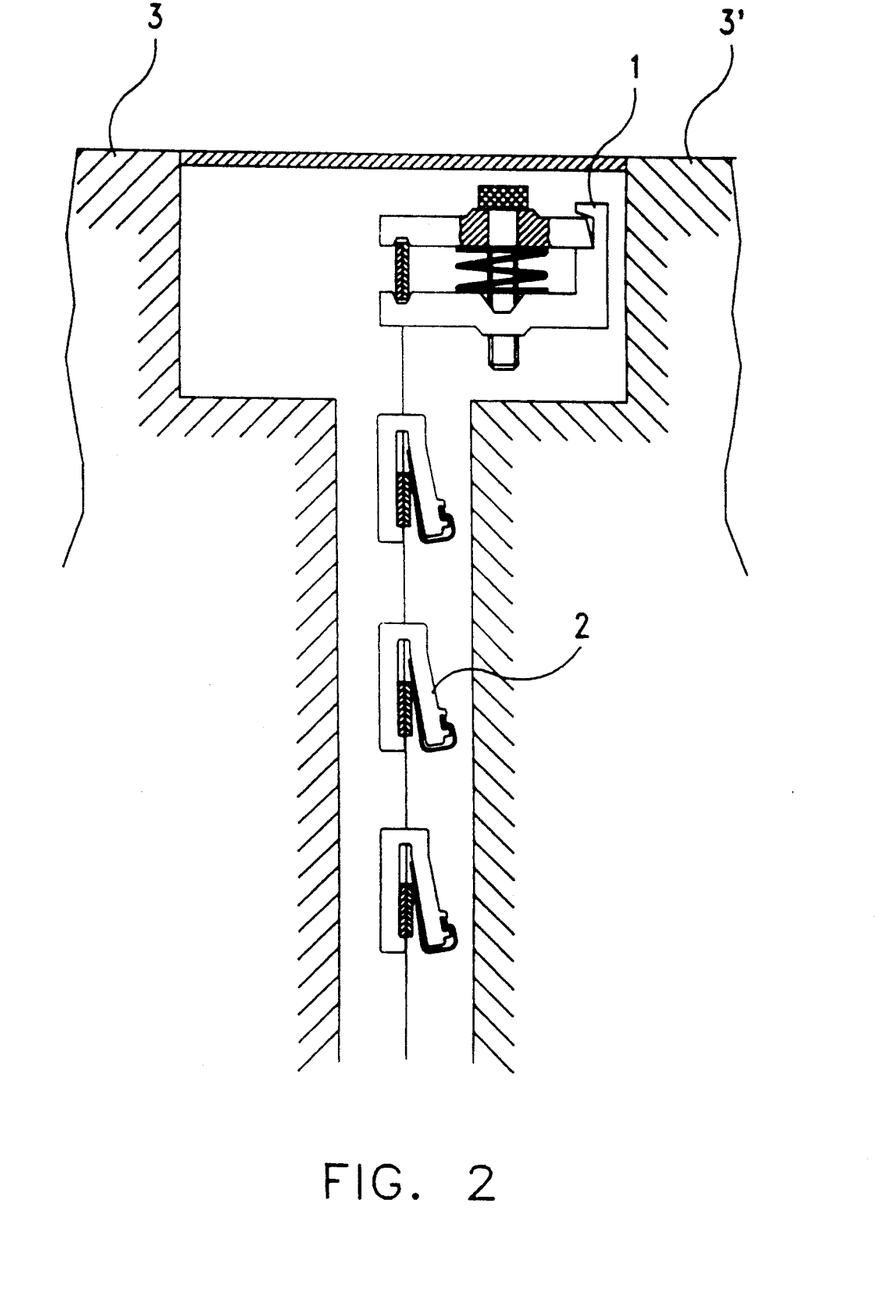
FIG. 2 illustrates a built-up screen coupling structure according to the present invention.
Figure 4:
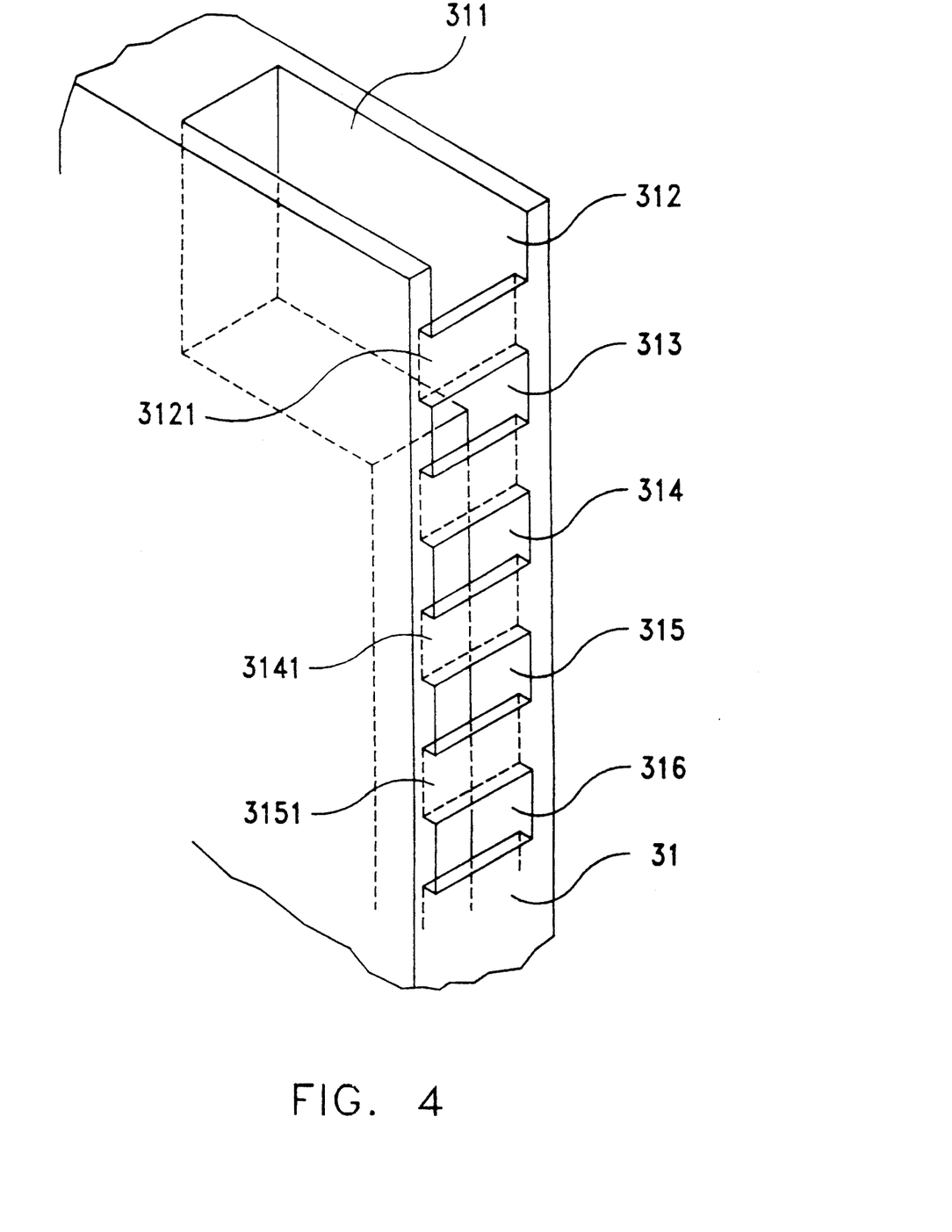
FIG. 4 illustrates the side end structure of the screen board frame according to the present invention.

Referring to FIGS. 2 through 4, a built-up screen is generally comprised of a plurality of screen board frames 3 flexibly connected in series by adjusting device 1 and fastening device 2. As illustrated in FIG. 4, a screen board frame 3 comprises a side end 31 having a slot 311 on the top and a plurality of relatively smaller openings 312, 313, 314, 315 and 316 on the outer side, which openings 312, 313, 314, 315 and 316 define therebetween a plurality of dividing boards 3121, 3141 and 3151 which are equal in size and spaced from one another at equal interval. It is to be understood that the number of openings and dividing boards are determined according to the size of the screen board frame.

Figure 32:
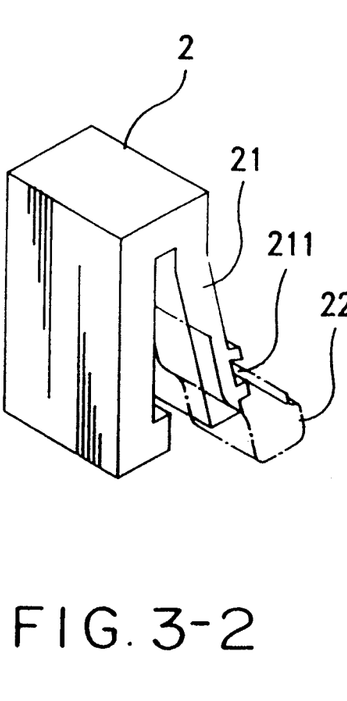
Figure 33:
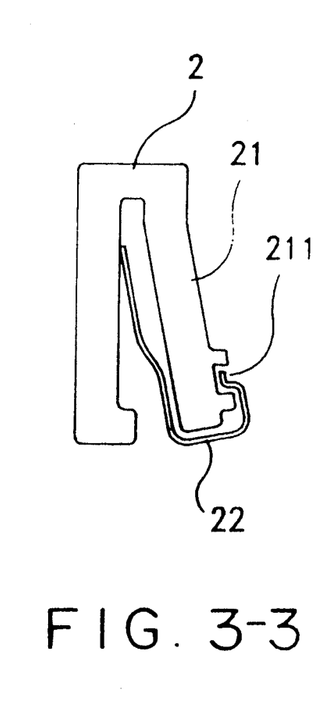

A fastening device 2, as shown in FIGS. 3-2 and 3-3, is substantially shaped as an inverted V-contour, having an oblique side wall 21 obliquely extending downward from a vertical side wall, defining therein a retaining space for retaining a plate spring 22. The plate spring 22 has a curved end 221 fastened in a groove 211 on the outer surface of the oblique side wall 21, and an opposite end retained inside the retaining space of the fastening device 2.

Figure 31:
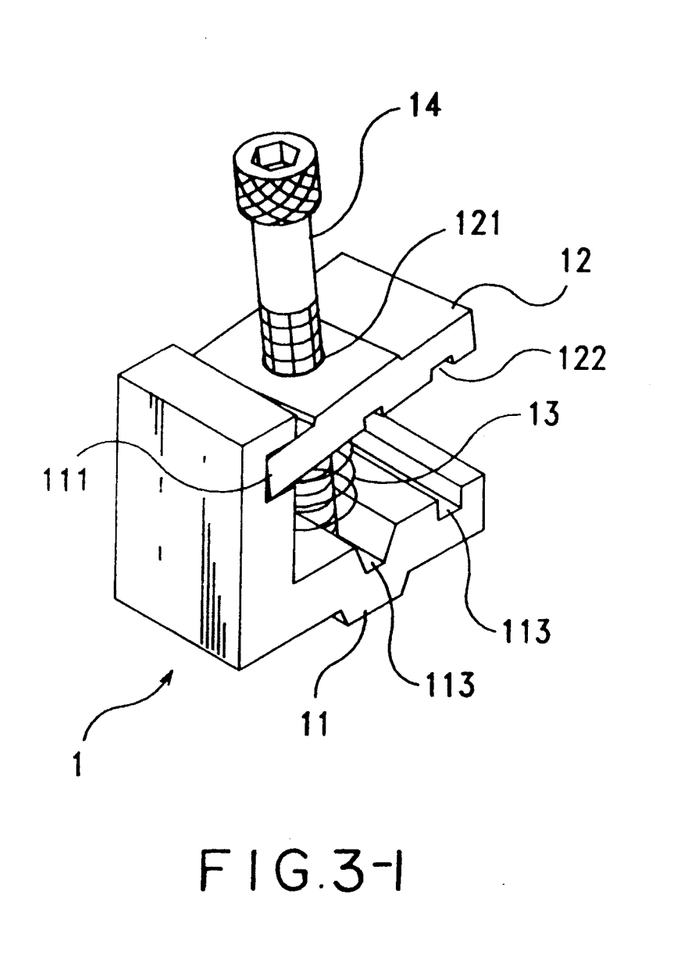

An adjusting device 1, as shown in FIG. 3—1, is generally comprised of a L-shaped base 11, a top board 12, a compression spring 13 and a bolt 14. The L-shaped base 11 has two grooves 111 and 113 respectively made on its inner wall surface at two opposite ends, and a bolt hole 112 at a suitable location. The top board 12 which has a groove 112 and a bolt hole 121 respectively made thereon at locations corresponding to the groove 113 and the bolt hole 112 of the L-shaped base 11 is transversely fastened in the groove 111 of the L-shaped base 11 to incorporate with the L-shaped base 11 into a substantially U-shaped configuration. The bolt 14 is fastened in the bolt holes 121 and 112 of the top board 12 and the L-shaped base 11. The compression spring 13 is sleeved on the bolt 14 and retained between the top board 12 and the L-shaped base 11.

Figure 5:
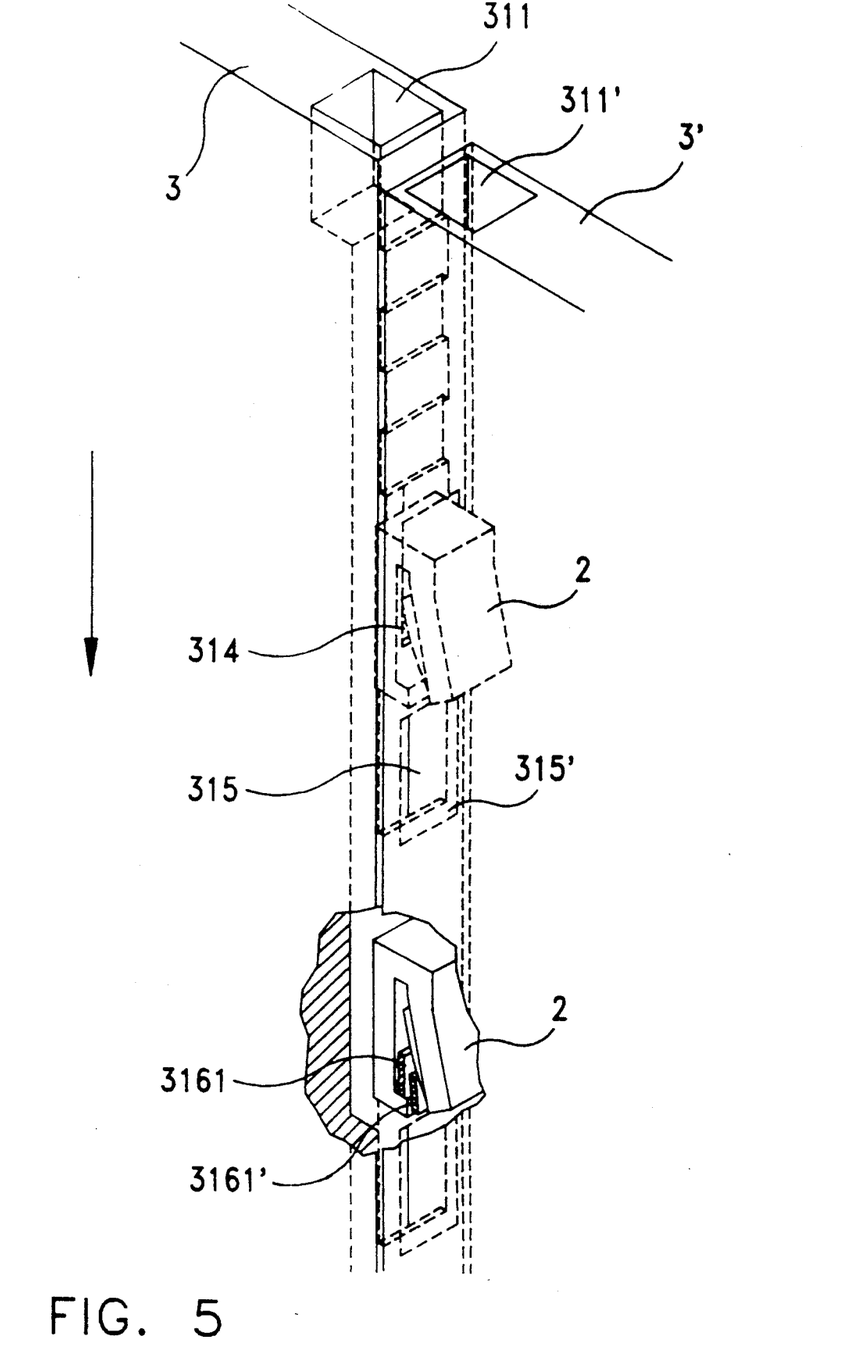
FIG. 5 illustrates an operation to mount the fastening device in the openings on the side end of the screen board frame according to the present invention.
Figure 6:
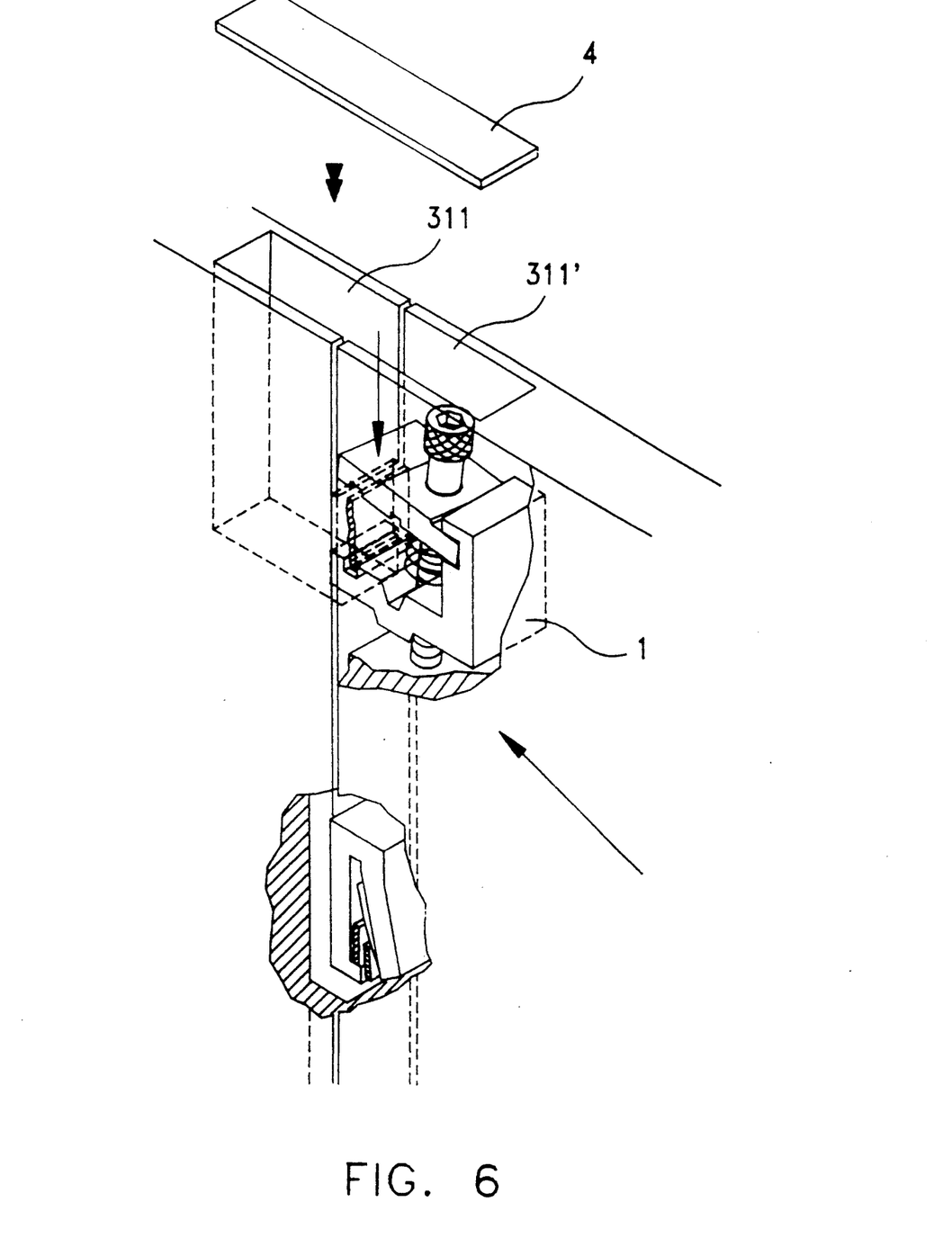
FIG. 6 illustrates an operation to adjust the adjusting device.

Referring to FIGS. 5 and 6, a fastening device 2 each is respectively mounted in the openings 314, 315 and 316 of the screen board frame 3, permitting the L-shaped end 23 to respectively hook up with the dividing boards 3141, 3151 and 3161, and permitting the plate spring 22 to respectively press against the dividing boards 3141, 3151 and 3161. Therefore, each fastening device becomes firmly retained on each dividing board. Another screen board frame 3' of the same structure is side matched to the screen board frame 3, permitting the oblique side wall 21 of each fastening device 2 respectively fastened in the openings 314', 315' and 316', and permitting the dividing boards 3141', 3151' and 3161' of the second screen board frame 3' to respectively insert in the retaining space of each fastening device 2. The adjusting device 1 is then fastened in the top slot 311 of the first screen board frame 3, permitting the dividing boards 3121 and 3121' to respectively set in the grooves 122 and 113 of the top board 12 and the L-shaped base 11. Then, fasten tight the bolt 14 to squeeze the top board 12 downward, so as to force the dividing boards 3121 and 3121' to be firmly retained between the grooves 122 and 113 and, simultaneously force the dividing boards 3141', 3151' and 3161' of the second screen board frame 3' to move upward to stop against the inner top of the retaining space of each fastening device 2. After the upper cap 4 is covered on the slots 311 and 311', the two screen board frames 3 and 3' become firmly side matched.

Figure 7:
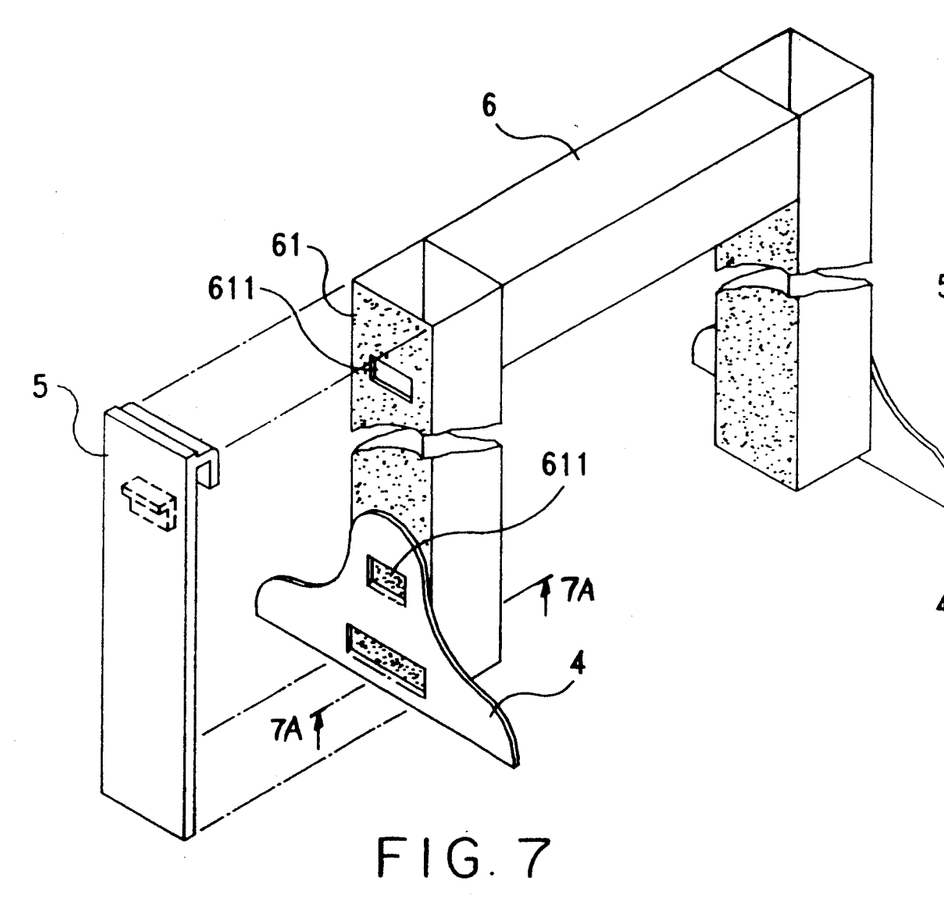
FIG. 7 is a schematic assembly view of the screen board frame, the side panel and the stand according to the present invention.
Figure 7A:
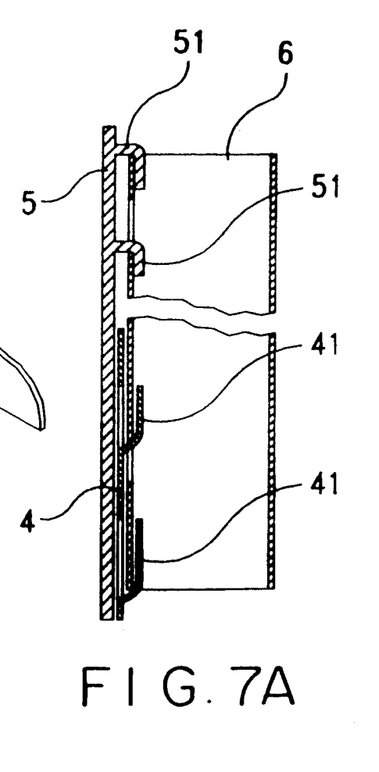
FIG. 7A is a cross-sectional view taken along line 7A—7A in FIG. 7.

FIG. 7 is a schematic assembly view of the screen board frame 6, the side panel 5 and the stand 4. The screen board frame 6 has a plurality of slots 611 on its side end 61. The stand 4 and the side panel 5 have each a plurality of hooks 41 or 51 on the inner side. By hooking up the hooks 41 or 51 in the slots 611, the stand 4 and the side panel 5 can be conveniently mounted on the screen board frame 6 in place without the use of any screws or other fastening elements.

Figure 8:
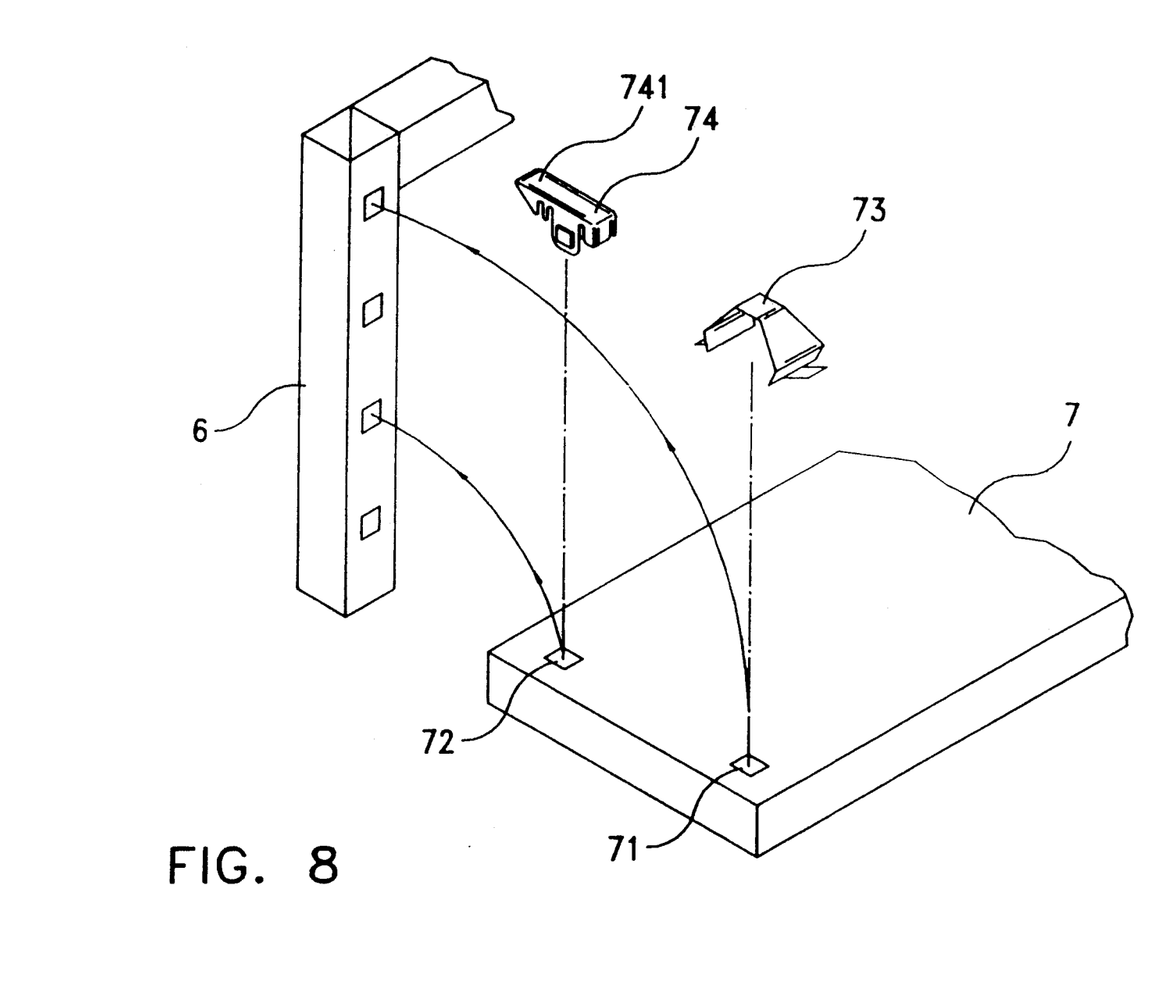
FIG. 8 is a schematic assembly view of the screen board frame and the face panel according to the present invention.

FIG. 8 is schematic assembly view of the screen board frame 6 and the face panel 7. The face panel 7 comprises two sets of notches 71 and 72 on the back at two opposite ends, wherein the notch 71 which is disposed at an upper position has a curved strip spring 73 fastened therein, and the notch 72 which is disposed at a lower position has a fastening element 74 secured therein. By engaging the curved middle part of the strip spring 73 and the terminal end 741 of the fastening element 74 in the corresponding notches made on the screen board frame 6, the face panel 7 can be conveniently attached to the screen board frame 6. Because the upper part of the face panel 7 is secured to the screen board frame 6 by the curved strip spring 73, the face panel 7 can be conveniently separated from the screen board frame 6 suring disassembly procedure.

Figure 9:
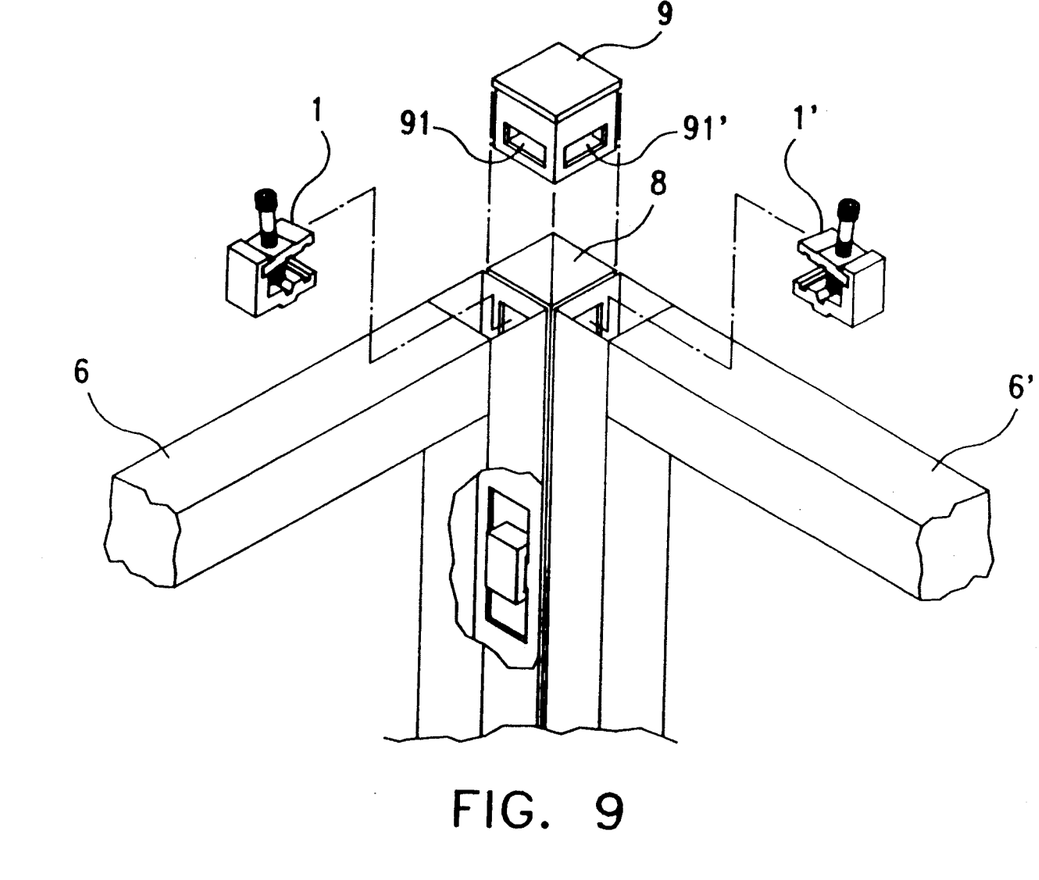
FIG. 9 illustrates two screen board frames connected together in 90° angle by a connecting frame and a columnar cover according to the present invention.

FIG. 9 illustrates two screen board frames 6 and 6' connected together in 90° angle by a connecting frame 8. The connecting frame 8 has side channels for mounting the screen board frames 6 and 6', and is covered with a columnar cover 9 at the top. The columnar cover 9 has holes 91 and 91' at the top for mounting an adjusting device 1 or 1' each to secure the connection of the columnar cover 9 with the two screen board frames 6 and 6'.

Figure 12:
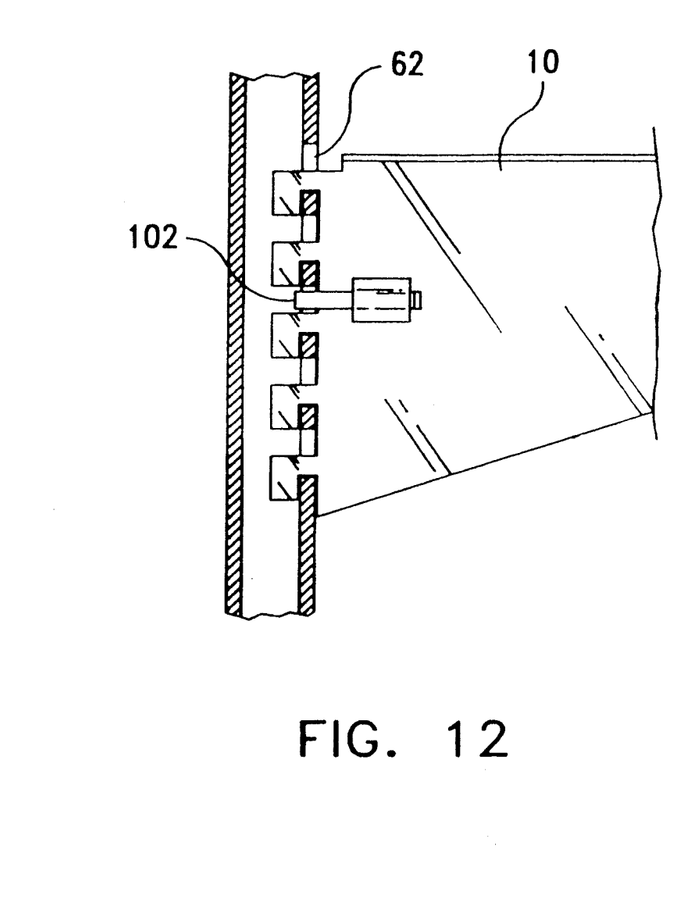
FIG. 12 illustrates the connection of a supporting plate to a screen board frame according to the present invention.
Figure 13:
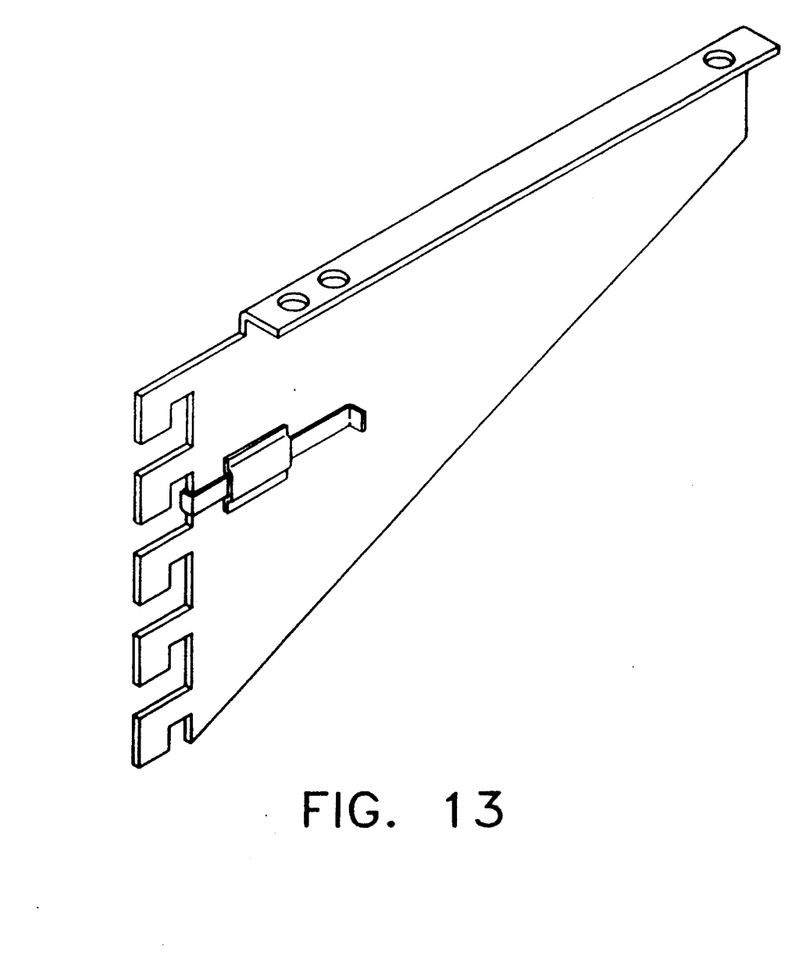
FIG. 13 is a schematic structural view of a supporting plate according to the present invention.
Figure 14:
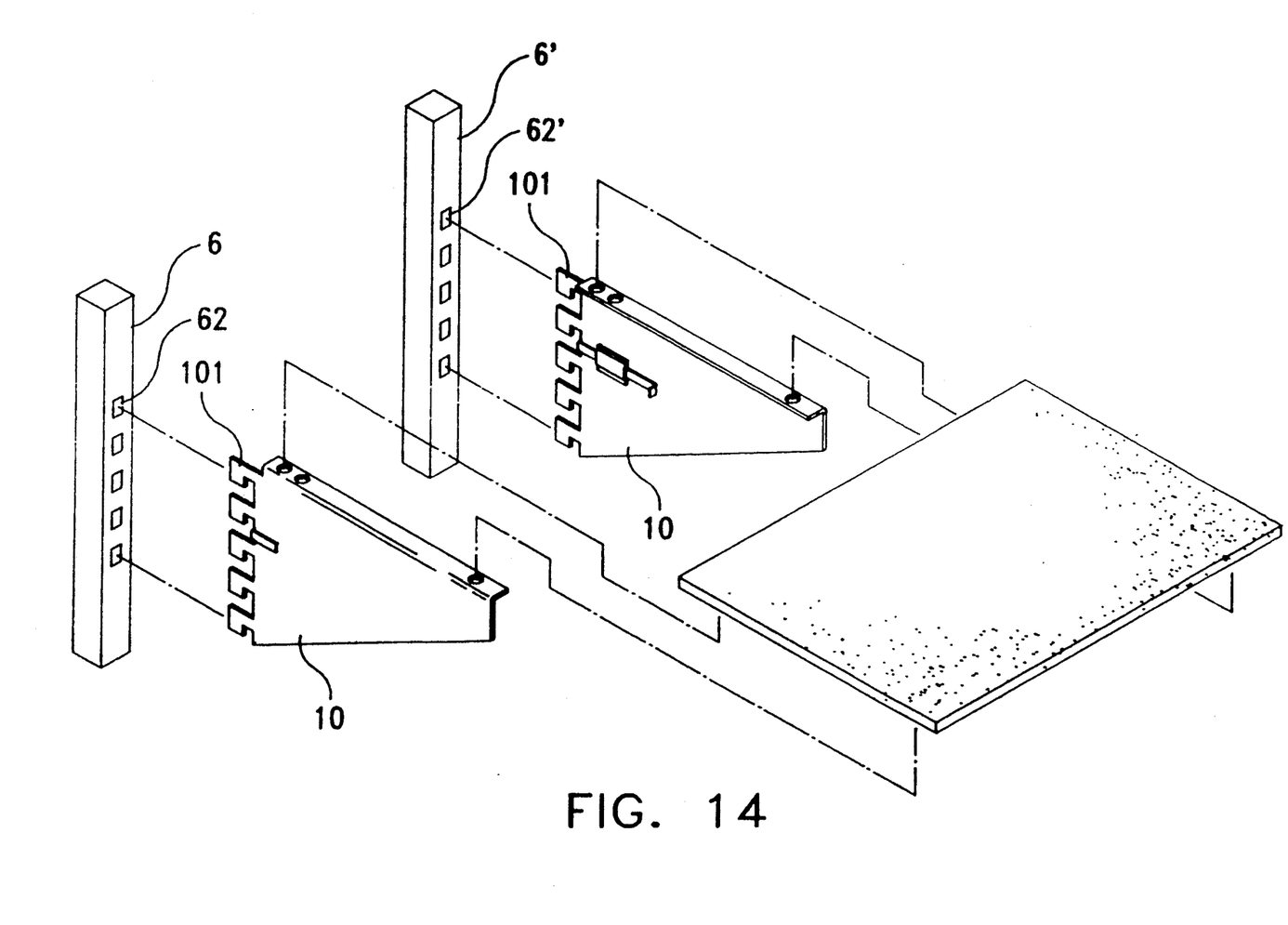
FIG. 14 is a schematic dismantled view of a table, two supporting plates and two screen board frames.

Referring to FIGS. 12 through 14, a screen board frame 6 or 6 has each a plurality of holes 62 or 62' for mounting a supporting plate 10 which is used for supporting a table. The supporting plate has a plurality of unitary hooked strips 101 respectively hooked in the holes 62 or 62' on the screen board frame 6 or 6', and at least a locking bar 102 releasably locked in either of the holes 62 or 62' to secure the connection.

I claim:

1. A built-up screen coupling structure, comprising:
  at least two screen board frames, each of said screen board frames defining a side end having a slot formed within a top portion thereof and a plurality of relatively smaller openings along on outer side, said smaller openings defining therebetween a plurality of dividing planar portions of substantially equal dimension and spaced at equal intervals;
  at least one adjusting device mounted within one of said slots within the top portion of the side end of one of said screen board frames, said adjusting device having an L-shaped base, a top board, a compression spring and a bolt, said L-shaped base defining an inner wall having a first groove, a bolt hole and a second groove respectively formed therein, said top board being transversely fastened in the first groove of said L-shaped base and having a top board groove and a bolt hole respectively formed therein at locations substantially aligned with the second groove and the bolt hole of said L-shaped base, said bolt being respectively fastened in the bolt holes on said top board and said L-shaped base, said compression spring being sleeved on said bolt and retained between said top board and said L-shaped base;
  a plurality of fastening devices respectively fastened in said screen board frame smaller openings to secure at least two screen board frames together, said fastening devices substantially defining an inverter U-contour, having an inclined side wall obliquely extending downward from a vertical side wall, defining therein a retaining space for retaining a plate spring, said plate spring having a curved end fastened in a groove formed within said oblique side wall on an external surface and an opposite end retained within said retaining space; and
  at least one face panel having a set of notches formed therein and vertically aligned on a back side with a curved strip spring and a fastening element respectively secured therein for fastening in corresponding holes made on said at least two screen board frames.

2. The built-up screen coupling structure of claim 1, wherein at least two screen board frames can be connected together orthogonal each to the other by a connecting frame, said connecting frame having side channels respectively for insertion therein of said two screen board frames and, being covered with a columnar cover at the top, said columnar cover having holes for mounting an adjusting device each to secure the connection.

3. The built-up screen coupling structure of claim 1, wherein said two screen board frames each have a plurality of notches for mounting a plurality of supporting plates for supporting a table, said supporting plates having a plurality of unitary, hooked strips at one end respectively hooked in the notches on said two screen board frames, and a locking bar locked in either of the notches on said two screen board frames to fixedly secure said screen board frames each to the other.

* * * * *